(12) United States Patent
Hoeft et al.

(10) Patent No.: US 7,191,160 B2
(45) Date of Patent: Mar. 13, 2007

(54) PLATFORM-INDEPENDENT DATA DICTIONARY

(75) Inventors: Kerstin Hoeft, Walldorf (DE); Michael Tsesis, Heidelberg (DE)

(73) Assignee: SAP AG, Walldorf (DE)

( * ) Notice: Subject to any disclaimer, the term of this patent is extended or adjusted under 35 U.S.C. 154(b) by 509 days.

(21) Appl. No.: 10/705,046

(22) Filed: Nov. 10, 2003

(65) Prior Publication Data

US 2005/0203938 A1    Sep. 15, 2005

(51) Int. Cl.
*G06F 15/18* (2006.01)
(52) U.S. Cl. ............... 706/12; 706/45; 706/46; 707/100
(58) Field of Classification Search ............. 707/1, 707/100, 102, 103; 706/45, 46, 12
See application file for complete search history.

(56) References Cited

U.S. PATENT DOCUMENTS

| | | | | |
|---|---|---|---|---|
| 5,418,957 A | * | 5/1995 | Narayan | 717/113 |
| 5,991,771 A | * | 11/1999 | Falls et al. | 707/202 |
| 6,377,953 B1 | * | 4/2002 | Gawlick et al. | 707/102 |
| 6,636,845 B2 | * | 10/2003 | Chau et al. | 707/1 |
| 7,051,041 B1 | * | 5/2006 | Miller | 707/102 |
| 7,058,645 B2 | * | 6/2006 | Seto et al. | 707/101 |
| 7,080,384 B2 | * | 7/2006 | Wall et al. | 719/316 |
| 7,117,215 B1 | * | 10/2006 | Kanchwalla et al. | 707/100 |

OTHER PUBLICATIONS

Tim Bray et al., Extensible markup Language (XML) 1.0 (Second Edition) W3C Recommendation Oct. 6, 2000, http://www.w3.org/TR/REC-xml.*
Henry S. Thompson et al., XML Schema Part 1: Structures, W3C Recommendation May 2, 2001, Sections 3.4, 3.14 http://www.w3.org/TR/2001/REC-xmlschema-1-20010502/.*

* cited by examiner

*Primary Examiner*—Joseph P Hirl
(74) *Attorney, Agent, or Firm*—Blakely, Sokoloff, Taylor & Zafman LLP (57) ABSTRACT

A server system may include a data dictionary to store platform-independent data types. A development client may access and modify a platform-independent data type stored in the data dictionary. The server system may notify other development clients using the data type that the data type has been modified.

20 Claims, 9 Drawing Sheets

PLATFORM-INDEPENDENT DATA DICTIONARY

TECHNICAL FIELD

Embodiments of the invention generally relate to the field of data dictionaries and, more particularly, to a system and method for a platform-independent data dictionary.

BACKGROUND

A "data dictionary" is a repository of data types and the relationships between the data types. The term "data type" refers to information that defines the semantic and syntactic properties of operational data, such as the type, length, and relationships of operational data. The data types stored in a data dictionary may be used during both design time and runtime. The term "design time" refers to the design and development of computer software (or simply, software). The term "runtime" refers to the actual execution of software.

A conventional data dictionary may be integrated into a traditional client/server system. For example, a development client may be used to define a data type and store the defined data type in a data dictionary on the server system (or in a data source to which the server system has access). The defined data type may, for example, specify the structure of a database table for the traditional client/server system. Software executing on a client system may access the defined data type and create a database table based on the defined data type.

Traditional client/server systems are implemented with a single stack of technology from the physical layer to the application layer. In traditional single stack client/server systems a single data source (e.g., a database system) provides the data for all clients interacting with the application servers. A model in which different parts of the technology stack are implemented by different vendors is replacing the traditional single stack model. In multi-vendor implementations of client/server systems, developers may write software in more than one programming language. Conventional data dictionaries are not desirable in multi-vendor implementations of client/server systems because they store data types that are language-dependent and/or platform specific. According to one embodiment, a method for providing platform-independent data types is disclosed. The method includes receiving a request for a data type from a client system, and providing the data type to the client system in response to the request, wherein the data type includes a platform-independent data type that is independent of platforms associated with the client system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a platform-independent data dictionary. The term "platform-independent" data dictionary refers to a data dictionary that provides data types that are not limited to a particular programming language or particular software and/or hardware architecture. As further described below, in one embodiment, the data types comply with the standard promulgated by the World Wide Web Consortium (W3C) entitled, "Extensible Markup Language (XML) 1.0 (Second Edition)," 6 Oct. 2000 (hereinafter, the XML Standard).

Figure 1:
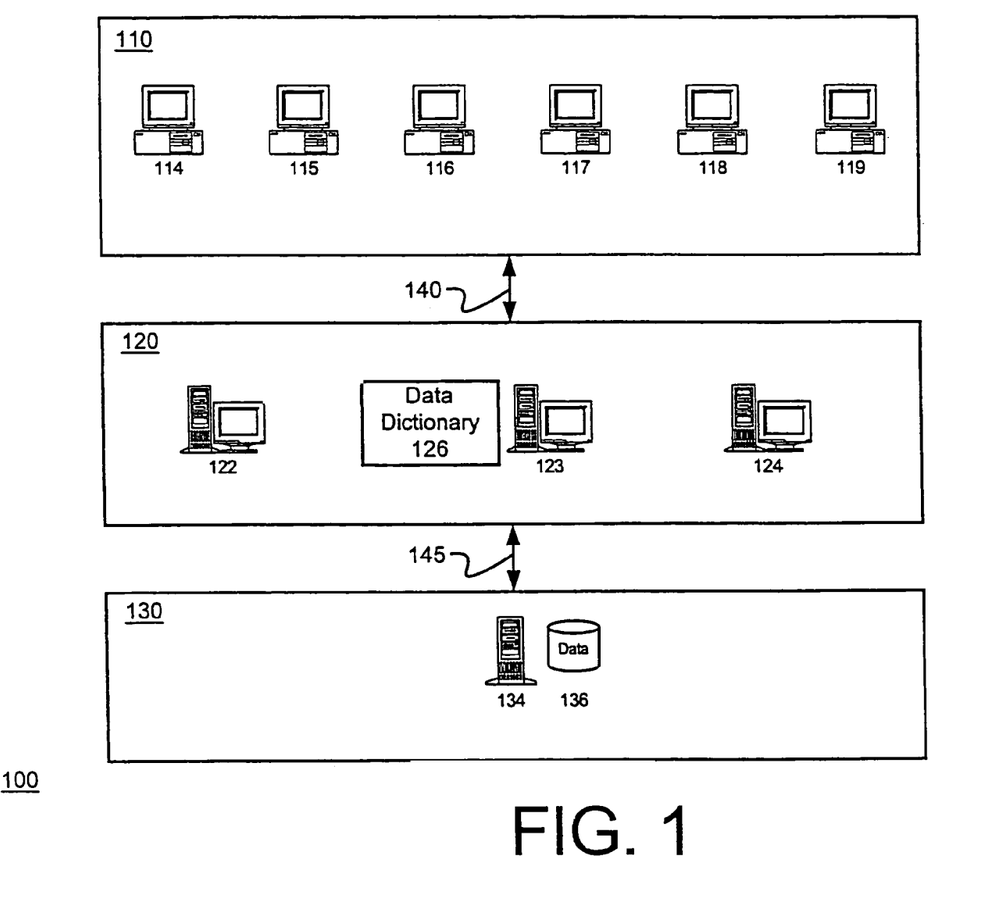
FIG. 1 is a block diagram of distributed system 100.

FIG. 1 is a block diagram of distributed system 100. The illustrated embodiment of distributed system 100 includes: user layer 110, application layer 120, and data access layer 130. Some or all of the elements within each layer of distributed system 100 may be interconnected via a network (e.g., a Local Area Network (LAN) and/or the Internet). Alternative embodiments of distributed system 100 may include more layers, fewer layers, and/or different layers.

User layer 110 is the interface between distributed system 100 and one or more users. The illustrated embodiment of user layer 110 includes user terminals 114–119. One or more of user terminals 114–119 may collect user input and send it to application layer 120 over network connection 140. Network connection 140 may be a wired or wireless connection to a Local Area Network (LAN), a Wide Area Network (WAN), a Metropolitan Area Network (MAN), and/or the Internet. User terminals 114–119 may be personal computers, notebook computers, personal digital assistants, telephones, and the like. In an embodiment in which network connection 140 connects to the Internet, one or more of user terminals 114–119 may have a Web browser to interface with the Internet.

In an embodiment, user layer 110 provides the presentation logic and the business logic for conventional distributed system 100. The term "presentation logic" refers to software that determines how information is provided to a user and how the user interacts with an application. The term "application" refers to software that performs work, such as data creation or manipulation. "Business logic" refers to software that performs data processing.

Application layer 120 includes application servers 122–124 and data dictionary 126. An application server broadly refers to a computing device that performs data processing. In a three-tier client/server environment, such as distributed system 100, application servers 122–124 may provide the business logic for distributed system 100. In an embodiment, application layer 120 includes a computing device (e.g., called a dispatcher) to perform load balancing among application servers 122–124. In an embodiment in which application layer 120 exchanges information with user layer 110 via the Internet, one or more of application servers 122–124 may be described as a Web application server. Application servers 122–124 may be implemented according to any of the Java 2 Enterprise Edition Specifications, for example, v1.4, published on Jul. 12, 2002 (hereinafter the J2EE Standard). The term J2EE application server broadly refers to an application server that implements, at least in part, one of the J2EE specifications.

Data dictionary 126 provides a repository of data types for distributed system 100. Data types include information that defines the semantic and syntactic properties of operational data, such as the type, length, and relationships of operational data. Data types defined in data dictionary 126 are, generally, available to applications operating on application servers 122–124. For example, applications operating on application servers 122–124 may use data or variables that are defined in data dictionary 126. In an embodiment, a first application executing on, for example, application server 123 during design time may obtain a data type from data dictionary 126. Similarly, a second application executing on application server 123 (or another application server) during design time may also obtain the data type from data dictionary 126. The first application may modify the obtained data type to produce a modified data type. In an embodiment, the changes made to the data type by the first application are propagated to the data type obtained by the second application. Thus, in an embodiment, distributed applications work with a current version of the data type. As is further described below, in such an embodiment, the data dictionary may provide platform-independent data types. In addition, services sitting on top of the data dictionary 126 may also use the defined data types and values.

Data access layer 130 provides a persistent data store for distributed system 100. The illustrated embodiment of data access layer 130 includes database computing device 134 and data source 136. Database computing device 134 may include database management systems (DBMSs). A DBMS refers to application software that controls the data in data source 136 including the overall organization of the data, retrieval of the data, and integrity of the data. Data source 136 may be, for example, a database or any other data source capable of providing a persistent data store.

Figure 2:
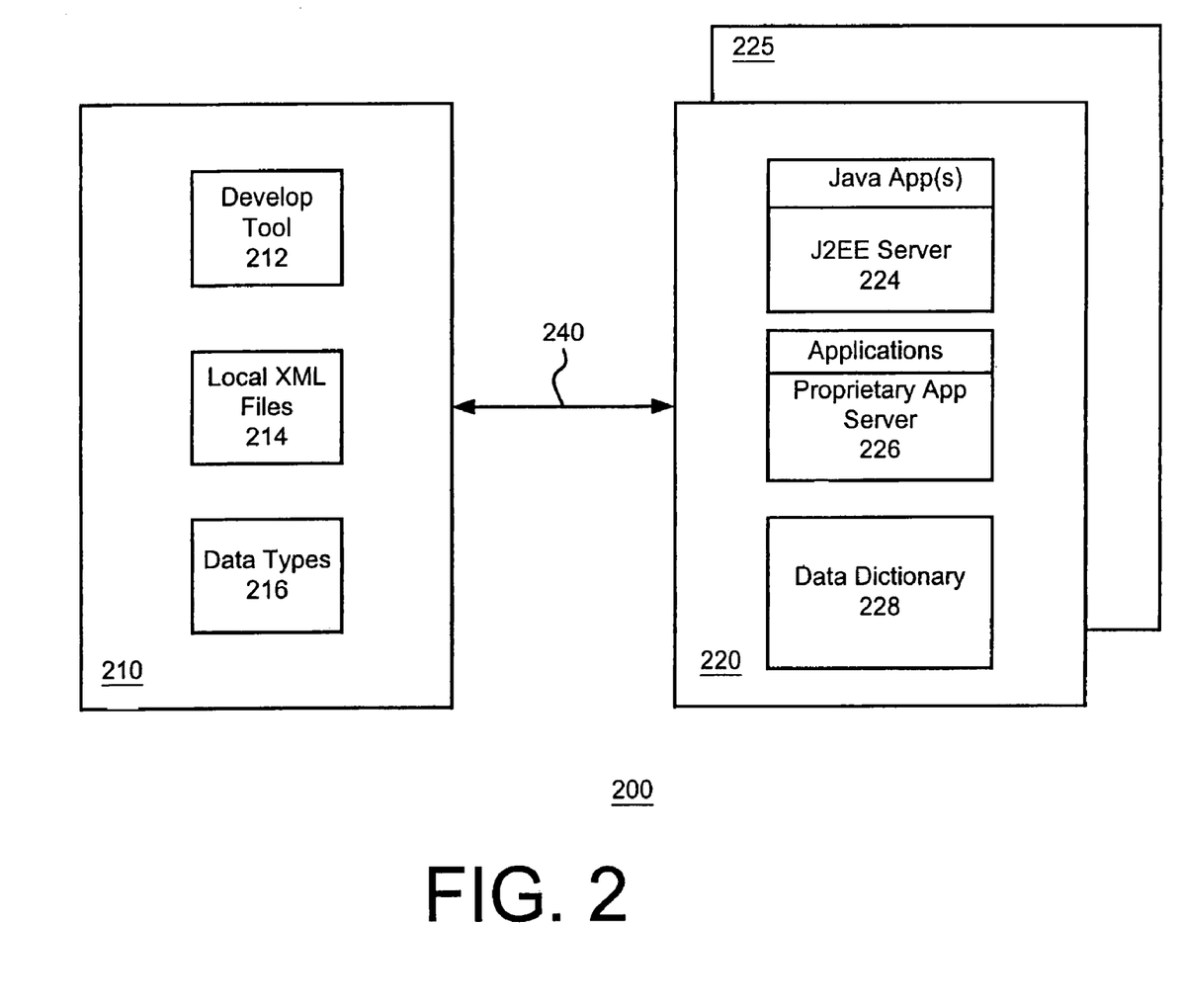
FIG. 2 is a simplified block diagram of distributed system 200 implemented to provide a platform-independent data dictionary, according to an embodiment of the invention.

FIG. 2 is a simplified block diagram of distributed system 200 implemented to provide a platform-independent data dictionary, according to an embodiment of the invention. Distributed system 200 includes development client 210 and application servers 220 and 225. In an embodiment, data types 216 are defined by development client 210 during design time and stored in data dictionary 228. At runtime, the operational data for applications executing on application server 220 and 225 may be structured by the data types stored in data dictionary 228.

Development client 210 includes development tool 212, local XML files 214, and data types 216. Development tool 212 provides a software development environment for writing computer software. In an embodiment, development tool 212 is an implementation of the Eclipse Platform available under the Common Public License from the Eclipse Consortium (www.eclipse.org). In an alternative embodiment, development tool 212 may be a different development environment.

Development client 210 may use development tool 212 to create data types 216. In an embodiment, data types 216 are platform-independent. A platform-independent data type refers to a data type that may be used by dissimilar systems (e.g., systems that use dissimilar software and/or hardware). In one embodiment, data types 216 are platform-independent because they comply with the XML Standard. The XML Standard specifies a markup language that uses tags to specify the content and structure of the data enclosed by the tags. Data that complies with the XML Standard is platform-independent because the data's content and structure is specified by the tags. A schema may be used to define the legal elements and structure of an XML document. A schema may comply with, for example, the schema standard promulgated by the W3C entitled, "XML Schema Part 1: Structures and XML Schema Part 2: Datatypes," 2 May 2001 (hereinafter, the XML Schema Standard). In an embodiment, the structure of data types 216 may be specified by one or more schemas that comply with the XML Schema Standard.

In an embodiment, some or all of the data types 216 may be transferred to data dictionary 228, for example, via network connection 240. Network connection 240 may be a LAN, WAN, MAN, and/or the Internet. In an embodiment, data types 216 are transferred over network connection 240 according to the Protocol described in Request For Comments (RFC) 2616 entitled, "HyperText Transport Protocol—HTTP/1.1," June 1999 (hereinafter, the HTTP Protocol). In alternative embodiments of the invention, data may be transferred according to a different protocol.

Application server 220 includes J2EE server 224, proprietary application server 226, and data dictionary 228. J2EE server 224 is, for example, a Web application server that complies with the J2EE Standard. Proprietary application server 226 may be a proprietary application server to support user terminals that implement a proprietary distributed system. In an embodiment, J2EE server 224 and/or proprietary application server 226 structure operational data based, at least in part, on the data type stored in data dictionary 228.

Figure 3:
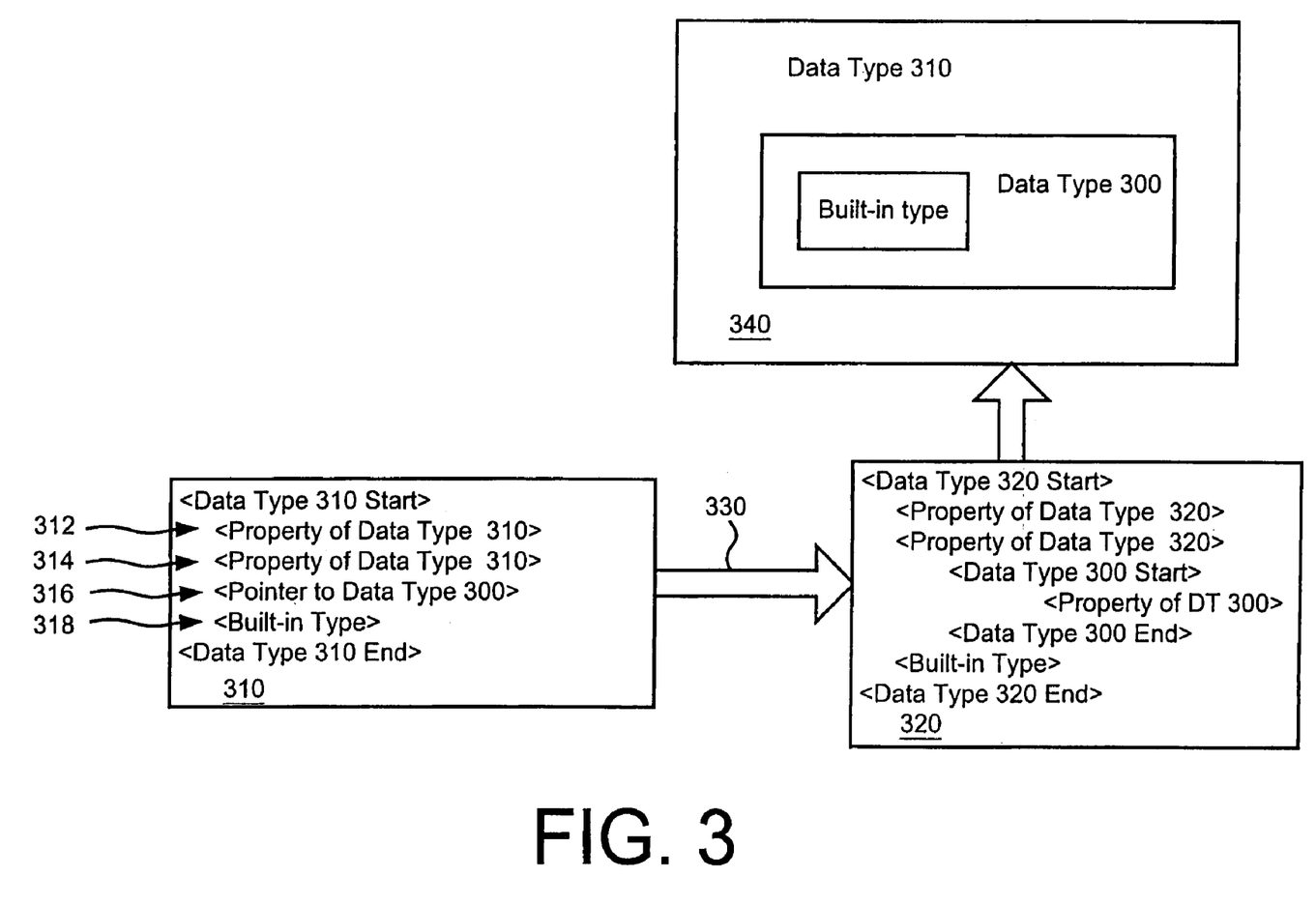
FIG. 3 is a simplified block diagram illustrating design time data type 310 and run time data type 320.

In an embodiment, the representation of a data type at design time is different than the representation of the data type at runtime. FIG. 3 is a simplified block diagram illustrating design time data type 310 and run time data type 320. In an embodiment, design time data type 310 and runtime data type 320 are written in accordance with a schema that defines the legal (or permitted) structure for the elements that are the constitute parts of a data type. In an embodiment, the elements of design time data type 310 and runtime data type 320 may include, for example, properties, constraints, attributes, preexisting data types, built-in types and the like. A "property" refers to an element of a schema (or file) that provides information about data (e.g., whether the data is a string or an integer). A built-in type refers to an element that is "built-in" to the programming environment. A "preexisting data type" refers to a data type that has been previously defined.

In an embodiment, data types 310 and 320 comply with the XML Schema Standard. In an embodiment, the elements of data types 310 and 320 comply with the XML Standard. In alternative embodiments of the invention, data types 310 and 320 comply with a different schema standard and the elements within data types 310 and 320 comply with a different language standard (e.g., a different markup language).

Design time data type 310 includes properties 312 and 314, pointer 316, and built-in type 318. Pointer 316 points to a preexisting data type 300 upon which data type 310 is based. For example, preexisting data type 300 may define a field. Data type 310, in turn, may define a table that includes the previously defined field. In the illustrated embodiment, built-in type 318 is any of the built-in types that are available to the programming language in which data type 318 is written. In an embodiment, built-in type 318 is one of the built-in types of the XML Standard. Properties 312 and 314 define attributes of data type 310. In an embodiment, properties 312 and 314 comply with the XML Standard. In an alternative embodiment, data type 310 inherits the properties of a previously existing data type (not shown). In such an embodiment, one or more properties of the preexisting data type may be modified (e.g., by overwriting the one or more properties) to create data type 310.

In an embodiment, generating process 330 converts design time data type 310 into runtime data type 320. Converting design time data type 310 into runtime data type 320 includes, in the illustrated example, replacing pointer 316 (which points to data type 300) with data type 300. For further information regarding replacing a pointer with a file (e.g., an XML file representing data type 300) see, for example, the Java 2 Platform, Standard Edition (J2SE), version 1.4.2, published June 2003 (hereinafter, the J2SE Standard).

In an embodiment, an application (not shown) builds Object 340 based on underlying data type 320. The term "object" refers to a self-contained entity that may consist of both data and procedures to manipulate the data. In an embodiment, Object 340 is an instance of the data type defined by data type 310. Object 340 is further discussed below with reference to FIG. 7.

Figure 4:
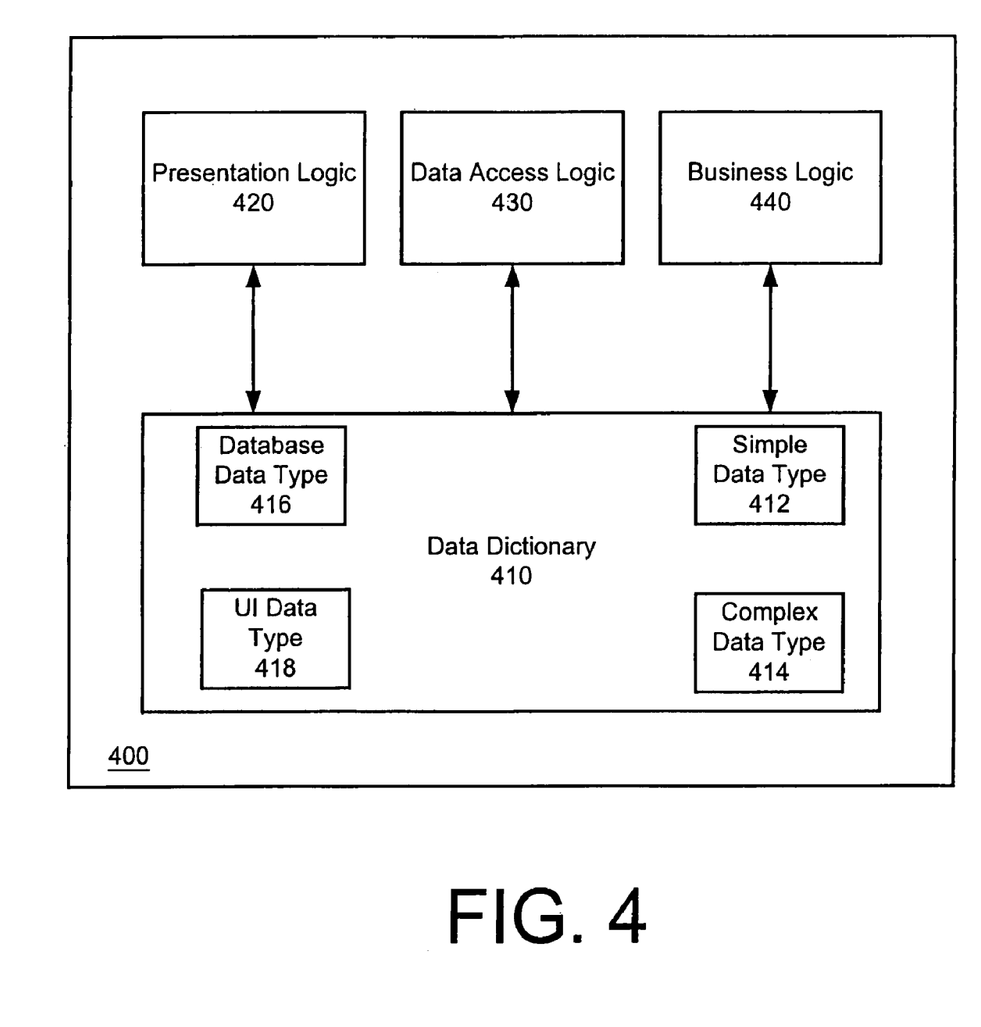
FIG. 4 is a conceptual block diagram illustrating distributed system 400.

FIG. 4 is a conceptual block diagram illustrating distributed system 400. In an embodiment, data dictionary 410 includes simple data type 412, complex data type 414, database data type 416, and user interface data type 418. Simple data type 412 and complex data type 414 are more fully described below with reference to FIG. 6.

In an embodiment, database data type 416 provides, at least in part, the semantic and syntactic definition of operational data for data access logic 430. Examples of database data type 416 include a definition of a database element, field, and/or table. Database data type 416 may specify properties for a database object including, for example, specifying the Java Database Connectivity driver (JDBC) with which the object may used. The term JDBC driver broadly refers to an Application Program Interface (API) that is bundled with the Java 2 Platform, Standard Edition (J2SE), version 1.4.2, published June 2003. In alternative embodiments of the invention, other APIs may be specified by database data type 416.

In an embodiment, User Interface (UI) data type 418 provides, at least in part, the semantic and syntactic definition of operational data for presentation logic 420. Examples of UI data type 418 include data types that determine the layout, composition, and/or color of objects that are displayed to a viewer (not shown). The properties of a UI data type may specify, for example, a field label, a column label, help text, and the like. UI data type 318 is further described below with reference to FIG. 6.

A data type defines, for example, how data is stored in memory. Different data types may exist because data may be used differently in distributed system 400. For example, character-type data is typically used to store and display values, whereas numerical-type data is used to perform calculations. Examples of data types used in distributed system 400 are further described below with reference to FIG. 6. Also, certain applications may require specifically defined data types. For example, a JDBC driver may use database data type 416, whereas a Web browser may use UI data type 418.

Figure 5:
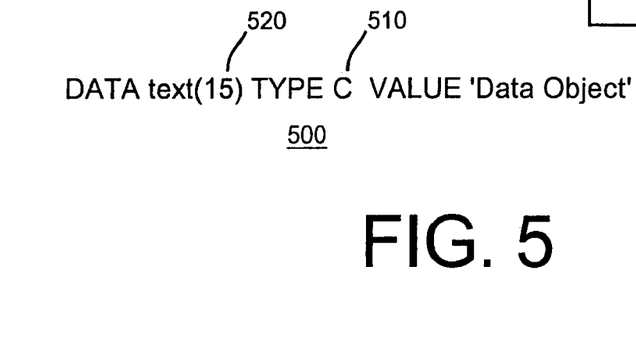
FIG. 5 illustrates exemplary DATA statement 400, suitable for requesting a data type according to an embodiment of the invention.

FIG. 5 illustrates an exemplary data statement 500 that may be used to request a data type, in an embodiment of the invention. A data type defines the attributes of a data object. Reference numeral 510 illustrates that the requested data type is "c" which, in the illustrated embodiment, refers to a character-type data type. The requested data object may have a length of 15 characters as illustrated by reference numeral 520. The data type of a data object determines how an application will handle the data. Data statement 500 may be used to create a data object that an application can access via the name "text." In the illustrated example, an application accessing the data object named "text" will store the object as character-type data in memory.

Figure 6:
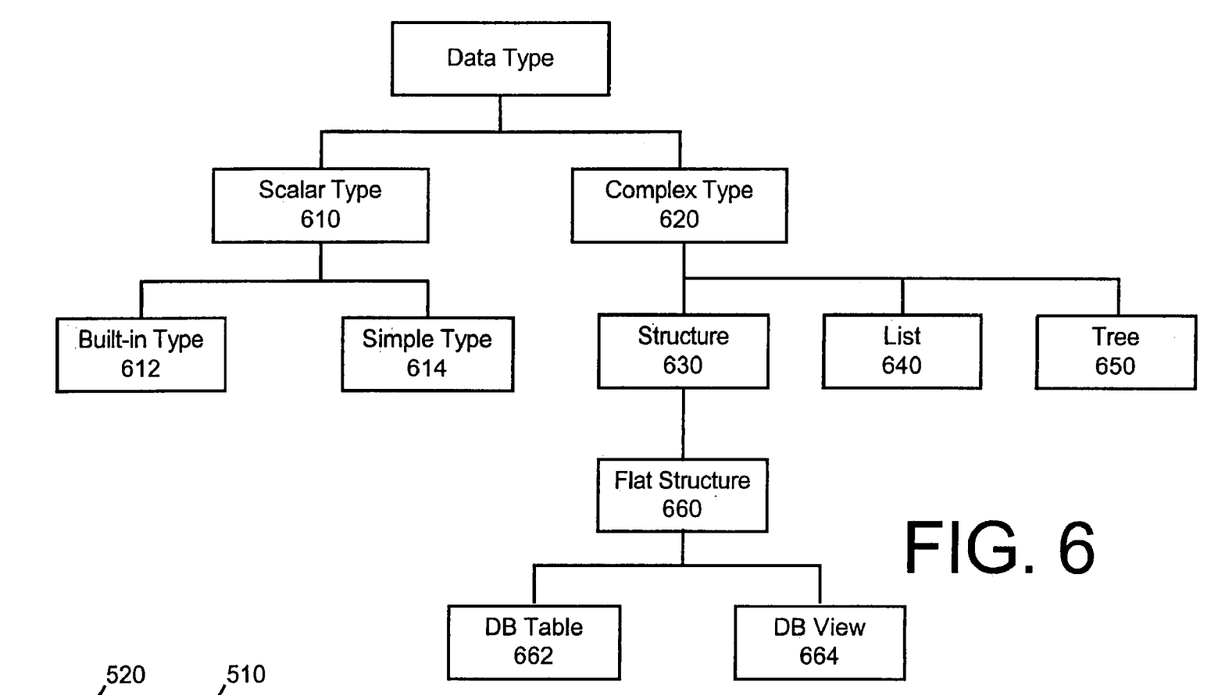
FIG. 6 illustrates exemplary data types available in an embodiment of the invention.

FIG. 6 is a conceptual illustration of data types available in an embodiment of the invention. In an embodiment, data types may be written or encoded in a markup language. A "markup language" refers to a computer software language in which labels are embedded within text to distinguish individual elements or groups of elements for display and/or identification purposes. The term "markup language based" refers to a software entity written, and/or encoded, and/or formatted in one of the markup languages. For example, in an embodiment, data types are encoded in one of the Extensible Markup Languages (XMLs) (e.g., the XML language specified by the XML Standard). The term "XML based" refers to a software entity written, and/or encoded, and/or formatted in one of the XML languages.

In an embodiment, data types may be hierarchically organized into either scalar type 610 or complex type 620. Scalar type 610 broadly refers to data types that hold a single data element such as an integer or a character. In an embodiment, scalar types may, for example, include: integer data types, string data types, floating point data types, and/or decimal data types.

Scalar type 610 includes built-in type 612 and simple type 614. Built-in type 612 represents scalar data types that are "built-in" to the schema that is used to define data types. In an embodiment, data types are structured according to the XML Schema Standard. In such an embodiment, built-in type 612 represents a built-in type of the XML Schema Standard. In alternative embodiments of the invention, built-in type 612 may represent a built-in type of another and/or a different standard.

In an embodiment, simple data type 614 represents a user defined scalar type. Simple data type 614 may be, for example, a user defined database data type (e.g., specifying a JDBC driver), a user defined UI data type (e.g., specifying the structure of a display), and/or previously defined data types from a proprietary system.

Complex type 620 refers to data types that hold multiple data items. In an embodiment, complex type 620 includes structure data type 630, list data type 640, and/or tree data type 650. In an embodiment, structure data type 630 contains one or more named fields. Each of the two or more named fields may contain a data type of any type. In an embodiment, flat structure data type 660 refers to a structured data type in which all of the named fields are scalar data types. List data type 640 refers to an ordered group of elements belonging to the same data type. In an embodiment, tree data type 650 refers to a data type having one root element and zero or more non-root elements. Each non-root element may have one predecessor element and zero, one, or more successor elements. Database table 662 may be a data type defining a database table. In an embodiment, database view 664 is a flat structure data type defining a logical view of one or more database tables.

Data types may be defined independently of the applications that use them. Applications may use data types to define data objects. The term "data object" refers to a self-contained module of data and its associated processing. In an embodiment, data objects comply with the Java Specification Request 12 entitled, "Java Data Objects (JDO) Specification," Apr. 30, 2002.

Figure 7:
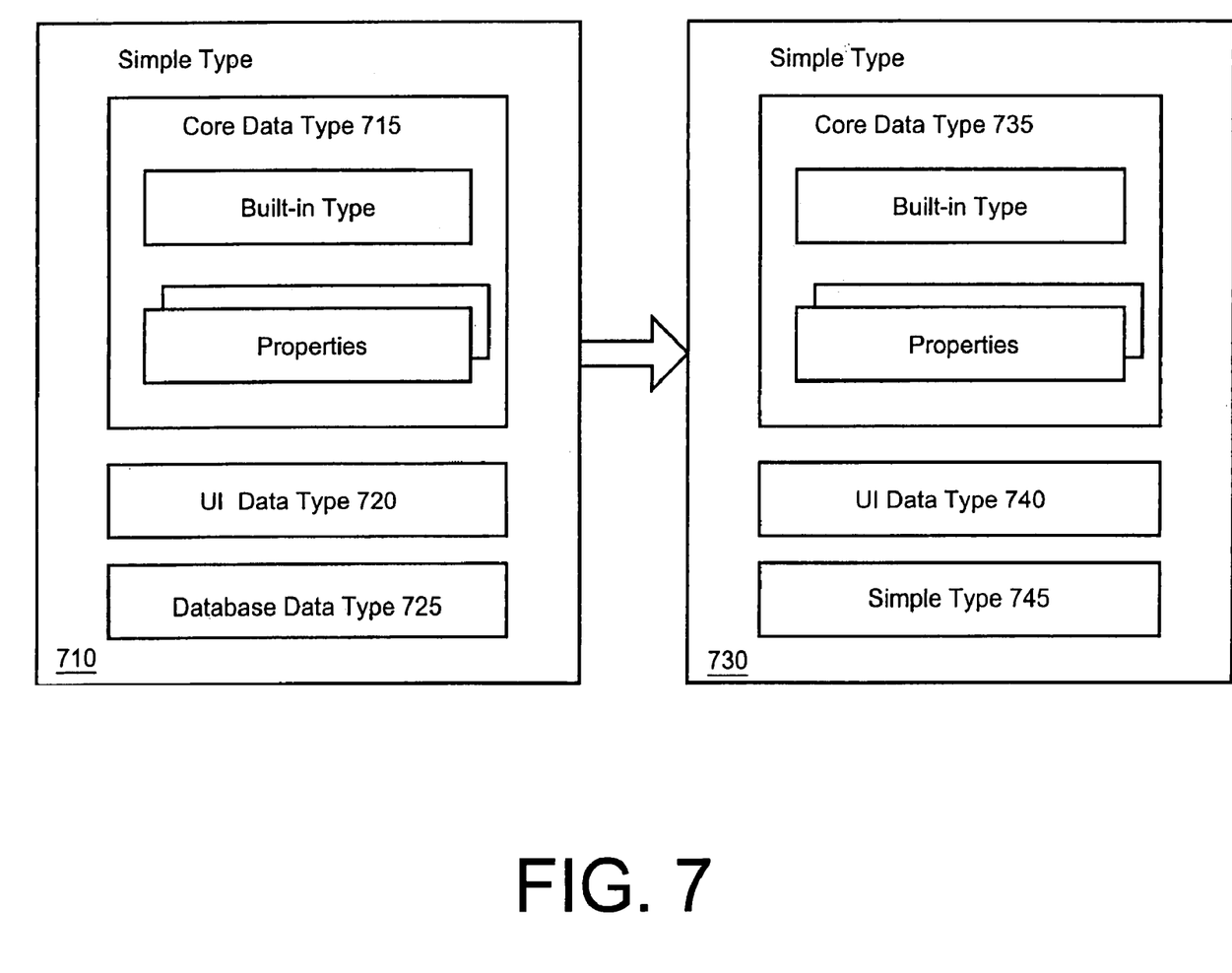
FIG. 7 is a simplified block diagram illustrating the copying and modifying of object 710.

In an embodiment, data objects (which are based on underlying data types) are copied and modified to form local data objects for an application. In an embodiment, data objects based on simple type data types are locally copied and modified. Copying and modifying data objects provides a mechanism to increase the variety of data objects that are supported by a data dictionary. FIG. 7 is a simplified block diagram illustrating the copying and modifying of object 710. Data object 710 is an instance of a data type that includes core data type 715, UI data type 720, and/or database data type 725. An application executing on an application server (e.g., J2EE Server 224, shown in FIG. 2) may create data object 710 in memory based on data types in a data dictionary (e.g., data dictionary 228, shown in FIG. 2). In an embodiment, data object 710 is an instance a simple type.

The application may copy data object 710 to create data object 730. Copying a data object may be performed according to, for example, the J2SE Standard. In an embodiment, methods may be called to add, remove, and/or change the constitute parts of data object 730. For example, database data type 725 may be removed and simple data type 745 may be added to data object 730. Similarly the properties of UI data type 720 may be changed to form UI data type 740.

Figure 8:
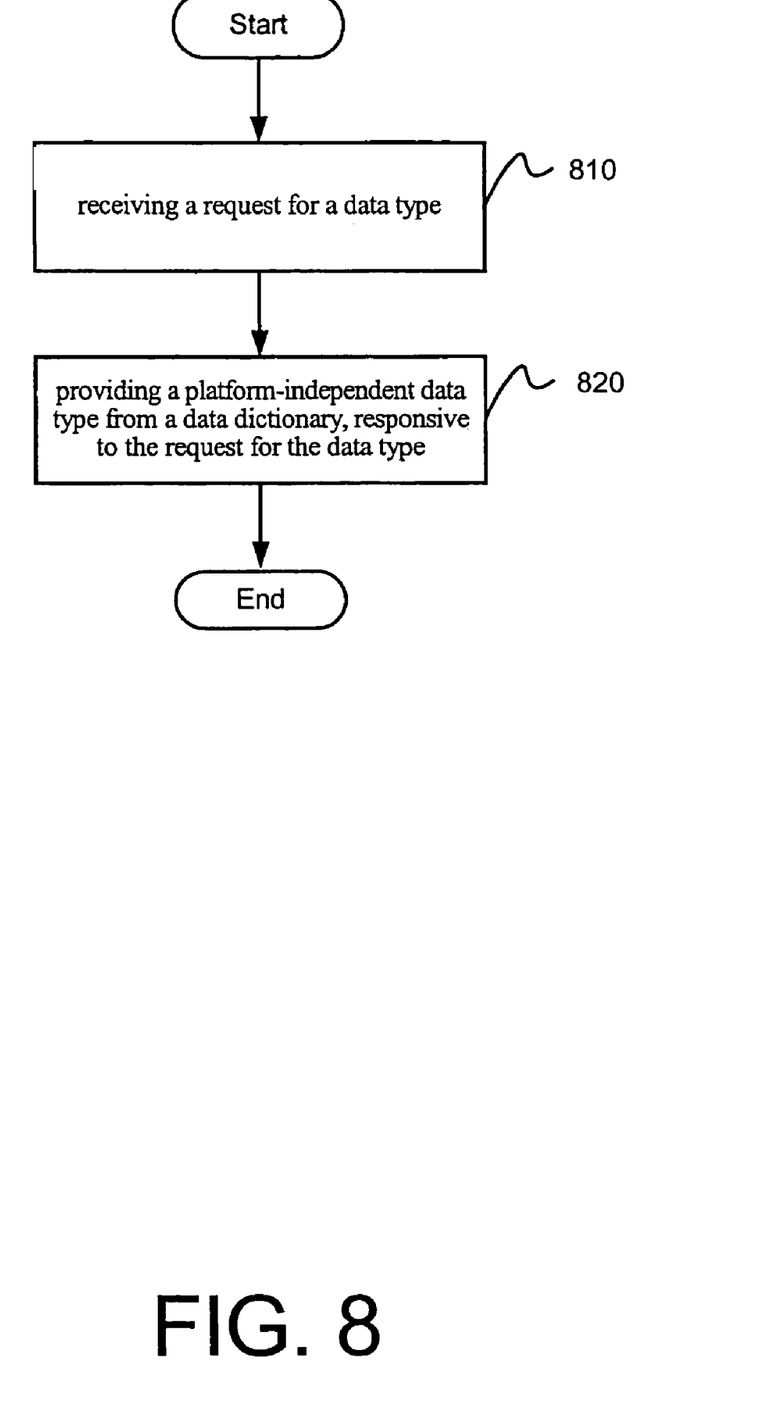
FIG. 8 is a flow diagram illustrating certain aspects of a method for providing a platform-independent data type, according to an embodiment of the invention.
Figure 9:
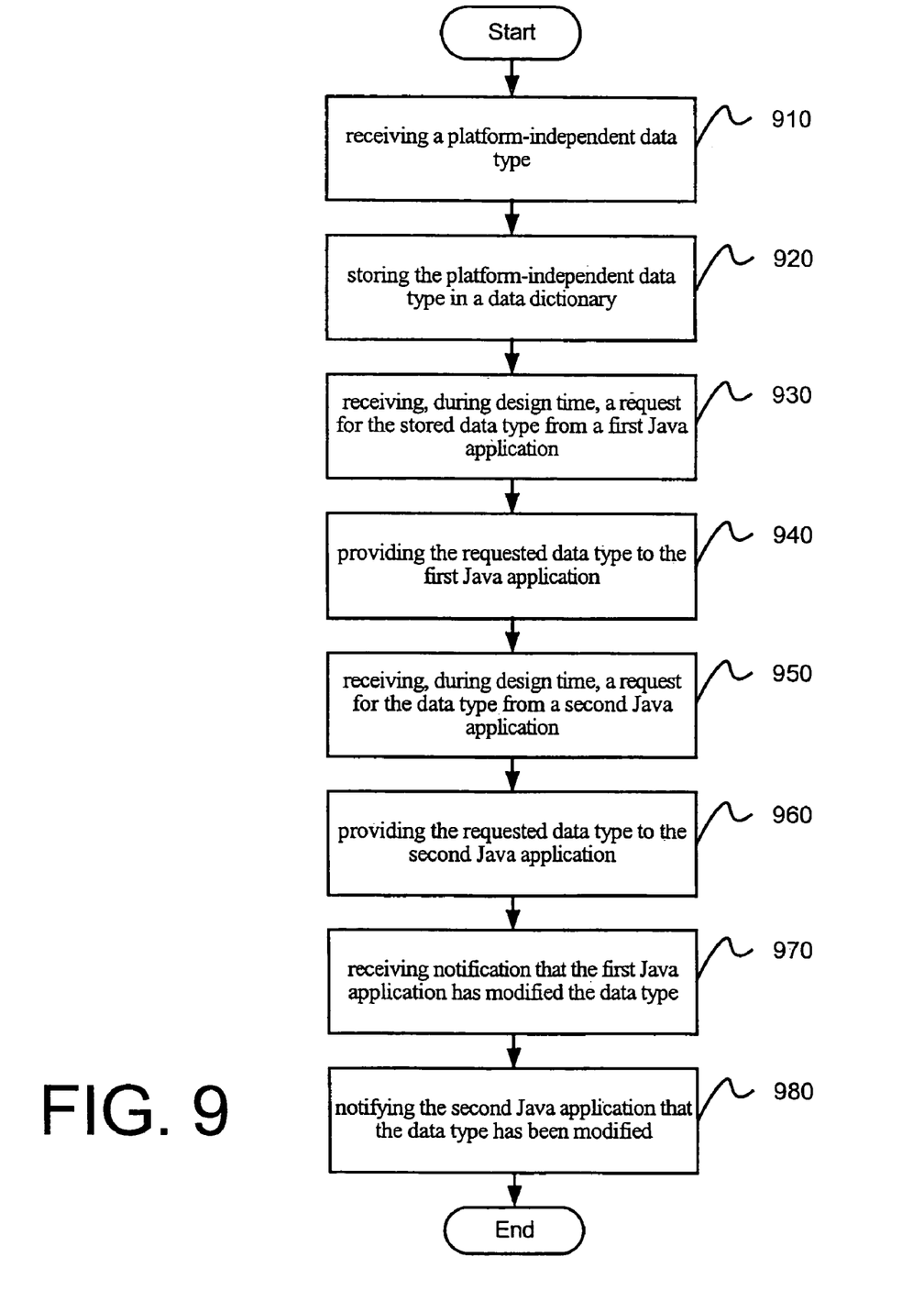
FIG. 9 is a flow diagram illustrating certain aspects of a method for receiving and processing a platform-independent data type during design time.

Turning now to FIGS. 8 and 9, the particular methods associated with embodiments of the invention are described in terms of computer software and hardware with reference to a flowchart. The methods to be performed by a platform-independent data dictionary may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for providing a platform-independent data type, according to an embodiment of the invention. Referring to process block 810, a request for a data type is received (e.g., via exemplary data statement 500, shown in FIG. 5). In an embodiment, the request for the data type originates at design time from, for example, a development tool (e.g., development tool 212, shown in FIG. 2). In an alternative embodiment, the request for the data type originates at runtime from an application (e.g., presentation logic 420, data access logic 430, and/or business logic 440, shown in FIG. 4).

Referring to process block 820, a platform-independent data type is provided from a data dictionary responsive to the received request for a data type. A platform-independent data type refers to a data type that may be used by dissimilar systems. In an embodiment, the provided data type is platform-independent because it complies with the XML Standard. A data type that complies with the XML Standard is platform-independent, at least in part, because the XML Standard specifies a markup language that makes data portable across different platforms.

FIG. 9 is a flow diagram illustrating certain aspects of a method for receiving and processing a platform-independent data type during design time. Referring to process block 910, a platform-independent data type is received. In an embodiment, the received data type complies with the XML Standard and may be sent from a development client (e.g., development client 210 shown in FIG. 2) during design time. The received platform-independent data type may be stored in a data dictionary (e.g., data dictionary 228 shown in FIG. 2) at 920.

Referring to process block 930, a request for the stored data type is received at process block 930. In an embodiment, a first Java application (e.g., development tool 212) requests the stored data type during design time. The requested data type is provided at 940. In an embodiment, more than one application may use a data type during design time. Process block 950 illustrates receiving a request for the data type from a second Java application (e.g., a second development tool) during design time. The data type is provided to the second Java application at 960. In an embodiment the requesting Java applications and the data dictionary may be on separate nodes (e.g., development client 210 and application server 220 shown in FIG. 2). In such an embodiment, a LAN, WAN, MAN, and/or the Internet may link the nodes and a transport protocol (e.g., the HTTP Protocol) may be used to transport the requests and/or the requested data type.

Referring to process block 970, a notification that the first Java application has modified the data type is received. In an embodiment, the first Java application may send the modified data type to the data dictionary to provide notification that the data type has been modified. In an alternative embodiment, the first Java application sends a notification stating which properties, attributes, built-in types, etc. of the data type have been modified. Referring to process block 980, the data dictionary (and/or logic associated with the data dictionary) informs the second Java application that the data type has been modified, for example, by providing the modified data type to the second Java application. In an embodiment, during design time, all applications using a given data type are informed each time the data type is modified. In such an embodiment, distributed development clients (or other applications) are able to work with current data types during design time.

Figure 10:
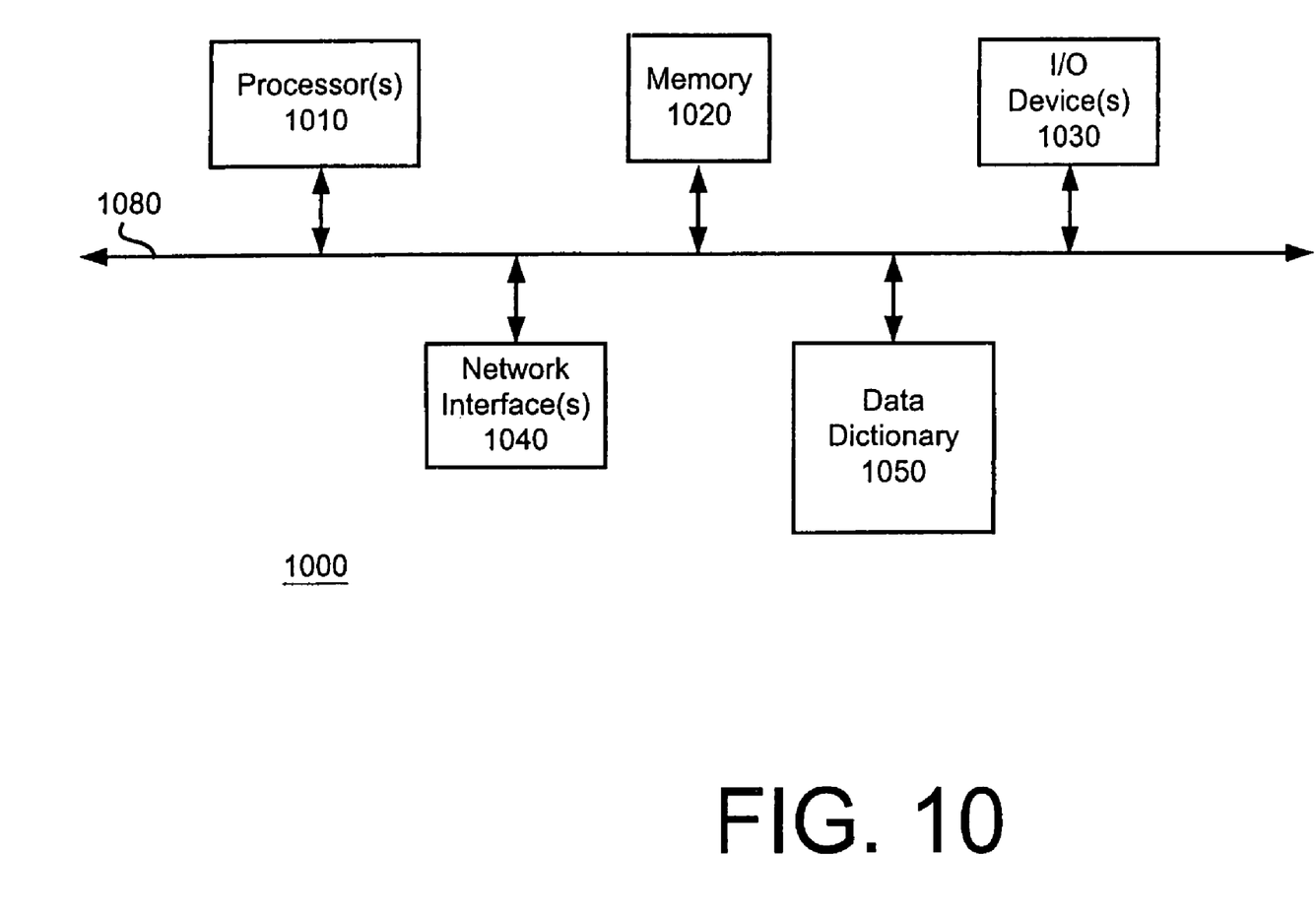
FIG. 10 is a block diagram of node 1000 implemented according to an embodiment of the invention.

FIG. 10 is a block diagram of node 1000 implemented according to an embodiment of the invention. Node 1000 may include: processor(s) 1010, memory 1020, one or more Input/Output devices 1030, network interface(s) 1040, and data dictionary 1050. The illustrated elements may be connected together through system interconnection 1080. Processor(s) 1010 may include a microprocessor, microcontroller, field programmable gate array (FPGA), application specific integrated circuit (ASIC), central processing unit (CPU), programmable logic device (PLD), and similar devices that access instructions from system storage (e.g., memory 1020), decode them, and execute those instructions by performing arithmetic and logical operations. In an embodiment, data dictionary 1050 provides one more scalar and/or complex data types to define operational data objects for node 1000.

Memory 1020 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1020 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1020 may store program modules such as routines, programs, objects, images, data structures, program data, and other program modules that perform particular tasks or implement particular abstract data types that facilitate system use.

One or more I/O devices 1030 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1080 permits communication between the various elements of node 1000. System interconnection 1080 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
   receiving a request for a data type from a client system; and
   providing the data type to the client system in response to the request, wherein the data type includes a platform-independent data type that is independent of platforms associated with the client system.

2. The method of claim 1, wherein providing the platform-independent data type comprises:
   providing a markup language based data type from a data dictionary at a server system, the server system including an application server.

3. The method of claim 2, wherein providing the markup language based data type comprises:
   providing an Extensible Markup Language (XML) base data type from the data dictionary.

4. The method of claim 3, wherein providing the XML based data type comprises:
   providing an XML based simple data type.

5. The method of claim 3, wherein providing the XML based data type comprises:
   providing an XML based database data type.

6. The method of claim 3, wherein providing the XML based data type comprises:
   providing an XML based complex data type.

7. The method of claim 6, wherein providing the XML based complex data type comprises:
   providing an XML based flat structure data type.

8. The method of claim 1, wherein providing the platform-independent data type comprises:
   providing the platform-independent data type during design time.

9. The method of claim 1, wherein providing the platform-independent data type comprises:
   providing the platform-independent data type that is based, at least in part, on a previously defined data type.

10. A system comprising:
    a client system to send a request for a data type to a server system; and
    the server system coupled with the client system, the server system to provide the data type to the client system in response to the request, wherein the data type includes a platform-independent data type that is independent of platforms associated with the client system.

11. The system of claim 10, wherein the client system comprises a development environment to develop software applications, the development environment including:
    a client system having a Java development environment.

12. The system of claim 11, wherein the platform-independent data type comprises:
    an Extensible Markup Language (XML) base data type.

13. The system of claim 12, wherein the server system comprises an application server, the application server including a Web application server.

14. The system of claim 13, wherein the Web application server comprises a Java 2 Enterprise Edition (J2EE) application server.

15. An article of manufacture comprising a machine-readable medium having instructions which when executed, cause a machine to:
    receive a request for a data type from a client system; and
    provide the data type to the client system in response to the request, wherein the data type includes a platform-independent data type that is independent of platforms associated with the client system.

16. The article of manufacture of claim 15, wherein the instructions when executed to provide the data type having the platform-independent data type, further cause the machine to provide an Extensible Markup Language (XML) based data type.

17. The article of manufacture of claim 16, wherein the instructions when executed to provide the XML based data type, further cause the machine to provide a XML based simple data type.

18. The article of manufacture of claim 16, wherein the instructions when executed to provide the XML based data type, further cause the machine to provide an XML based complex data type.

19. The article of manufacture of claim 16, wherein the instructions when executed to provide the XML based data type further cause the machine to provide an XML based database data type.

20. The article of manufacture of claim 16, wherein the instructions when executed to provide the XML based data type further cause the machine to provide an XML based user interface data type.

* * * * *